United States Patent Office
2,719,535
Patented Oct. 4, 1955

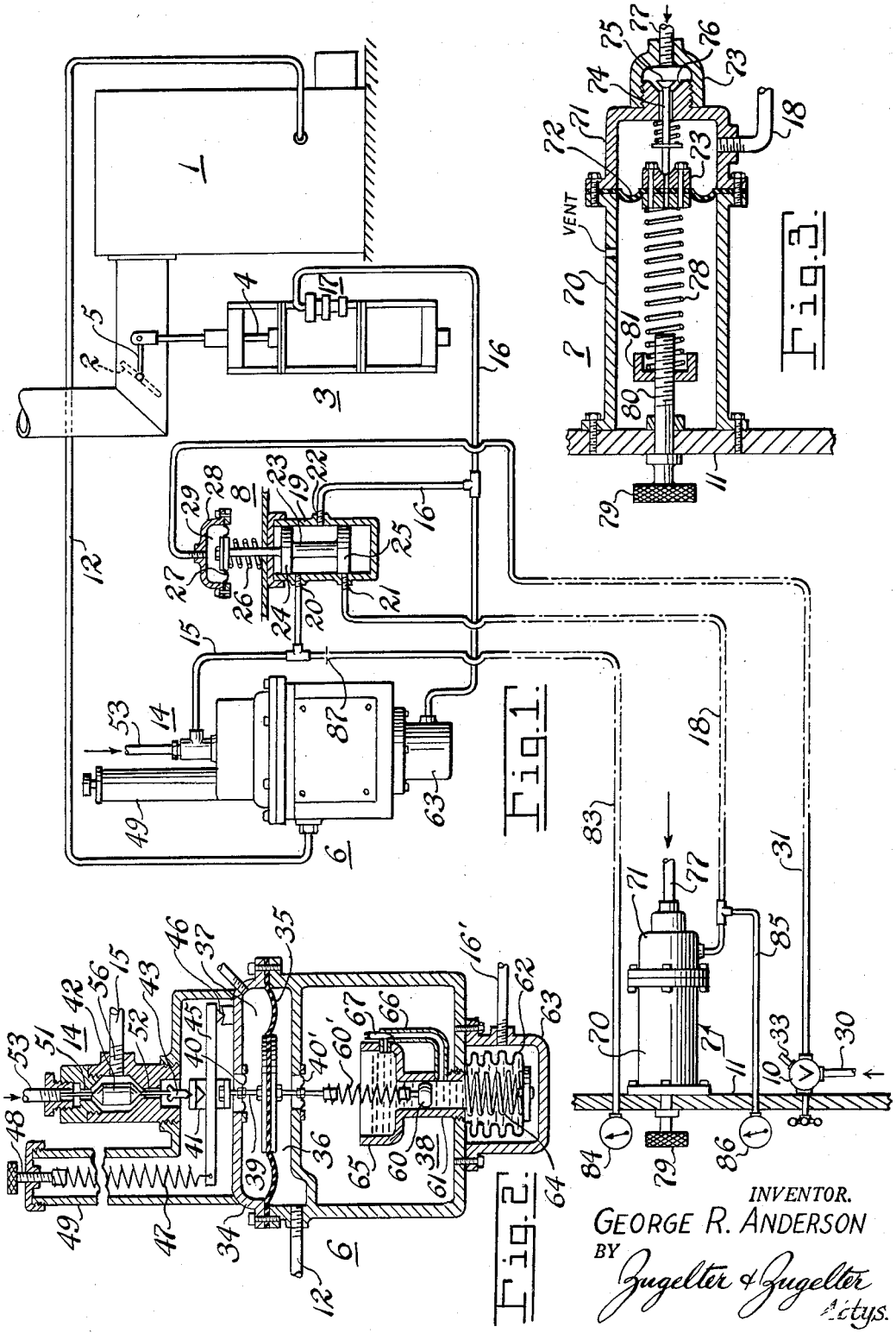

2,719,535

CONTROL SYSTEMS PROVIDED WITH MEANS FOR REMOTE CONTROL OF TRANSFER FROM AUTOMATIC TO MANUAL OPERATION

George R. Anderson, Mount Lebanon, Pa., assignor to Hagan Corporation, Pittsburgh, Pa., a corporation of Pennsylvania Application November 2, 1950, Serial No. 193,718

4 Claims. (Cl. 137—85)

This invention relates to systems whereby a variable condition such as furnace draft, may be regulated automatically or manually, and more particularly, to a system having means that may be located at a point remote from the furnace or point of regulation for transferring the regulating operation from automatic to manual, or vice versa.

An object of this invention is to provide a system having means for effecting either automatic or manual regulation of a variable.

Another object of the invention is to provide a system of the type referred to above, having means that may be located at a point remote from the point of regulation, whereby control of the variable may be shifted from automatic to manual.

A further object of the invention is to provide a system having means for manually transferring the system from automatic to manual operation, or vice versa, without disturbing the magnitude of the control force at the instant of transfer, thereby effecting so-called "bumpless" transfer.

The above and other objects of the invention will be apparent to those skilled in this art from the following description taken in conjunction with the accompanying drawings, in which:

Fig. 1 is a more or less diagrammatic view of the regulating system embodying a form of the invention, the system including means for effecting from a remote point, transfer of the system from automatic to manual operation, or vice versa;

Fig. 2 is a view in section of a regulator embodied in the system of Fig. 1; and Fig. 3 is a view in section of a manually operable device embodied in the system of Fig. 1 for effecting manual operation of the regulating system.

The system shown in Fig. 1 is designed to regulate a variable either automatically or manually, the system being provided with means for effecting a transfer of the regulating function from automatic to manual operation, or vice versa. The system includes means for effecting what is called in this art "bumpless" transfer from manual to automatic operation.

The specific application of the system illustrated in Fig. 1 is that of regulating the draft of a furnace 1. Furnace 1 is provided with a damper or valve 2 in the uptake thereof, by means of which the pressure in the combustion chamber may be adjusted and controlled. The damper may be actuated by an operator 3 such as a power cylinder, the piston of which is connected by its piston rod 4 to a crank arm 5 of the damper shaft.

The control system described infra is desiged to be responsive to a regulated pressure, as for example, the pressure in the combustion chamber of furnace 1 and to so control automatically the operation of the power cylinder 3 and the position of damper 2 that the pressure in the combustion chamber is maintained substantially constant at some predetermined value. The pressure to be maintained substantially constant in the combustion chamber may be referred to as the regulated pressure. The value of the regulated pressure may be atmospheric or it may be of a value either above or below atmospheric, depending upon the operating conditions encountered in practice. The system is also so designed that operation of the power cylinder 3 may be effected by manual control of the system.

The system as illustrated comprises a regulator 6 that is responsive to the controlled furnace pressure, and develops a control force or pressure for automatically operating the power cylinder, a manually operable regulator 7, a transfer mechanism 8 for shifting the control of the power cylinder from automatic to manual operation, and a transfer valve 10 for actuating the transfer mechanism from automatic to manual positions, or vice versa. In practice, power cylinder 3, regulator 6 and the transfer mechanism 8 would be located relatively close to furnace 1, but regulator 7 and transfer valve 10 may be located at a place relatively remote from the furnace and mounted on a suitable panel board 11.

The regulated furnace pressure is communicated to regulator 6 by a pipe 12. Regulator 6 responds to the regulated pressure and actuates a valve 14 that transmits a control pressure of variable magnitude through a sending line 15 to the transfer mechanism 8. When mechanism 8 is in automatic position, the control force from line 15 passes through mechanism 8 to a line 16 leading to the pilot valve mechanism 17 of power cylinder 3. The pressure established in sending line 15—16 by regulator valve 14 depends on the deviation or departure of the regulated pressure from a predetermined value. The piston of the power cylinder 3 will be actuated from one position to another in accordance with the output pressure of valve 14, whereby damper 2 will be actuated to such a position as will result in the controlled or regulated pressure being held substantially constant in the furnace.

The manually actuated regulator 7 is so designed that by manual adjustment thereof, a control pressure will be transmitted therefrom through a sending line 18 to the transfer mechanism 8. When transfer mechanism 8 is in automatic position the control pressure in line 18 can not pass through the transfer mechanism. However, if the transfer mechanism is in manual control position, the control pressure in line 18 passes through transfer mechanism 8 into sending line 16 and thence to the pilot valve mechanism 17 of power cylinder 3.

Transfer mechanism 8 comprises a valve body 19 having spaced inlet ports 20 and 21, a common outlet port 22, and a valve 23 having spaced lands 24 and 25. The spacing of the lands 24 and 25 is such that when the mechanism is in automatic position, inlet port 21 to which control line 18 is connected, is closed and inlet port 20 to which sending line 15 is connected is open. When valve 23 is moved downwardly to a position where land 24 covers inlet port 20, the inlet port 21 is open, whereby sending line 15 is cut off from sending line 16 and communication between sending lines 18 and 16 is established.

Valve 23 is normally urged to automatic position by means of a spring 26 disposed between the valve body and an actuating diaphragm 27. Diaphragm 27 is secured to the open end of a housing 28 so as to form therein a pressure-tight chamber 29. Operating pressure may be supplied to or exhausted from chamber 29 by the transfer valve 10. When transfer valve 10 is turned to one position, pressure from a supply pipe 30 is delivered through a pipe 31 to the diaphragm chamber 29, whereby the valve 23 is actuated from automatic to manual position. When valve 10 is turned to another position, that is, automatic position, pressure is exhausted from chamber 29 through line 31 to the atmosphere through an exhaust port 33.

Regulator 6 comprises a two-part housing 34 between which a diaphragm 35 is clamped at its marginal edge, thereby dividing the housing into pressure-receiving chambers 36 and 37, a valve 14 and a stabilizer such as a dashpot 38. Diaphragm 35 is connected to valve 14 by a link 39 that extends through a sealing diaphragm 40 and a yoke 41. As shown, a valve 42 within the body of valve 14 is connected to yoke 41 by a link 43. Yoke 41 bears on a beam 45 which is mounted at one end on a knife edge 46, the other end of the beam being connected to a tension spring 47. As shown, the upper end of the spring is connected to an adjustment 48 which is threaded into a tubular support 49 mounted on the diaphragm housing. In practice, the tension of spring 47 is adjusted to a value sufficient to support the dead weight of diaphragm 35, yoke 41 and the links connecting the yoke to valve 42.

Valve 42 operates between an inlet port 51 and an exhaust port 52. The inlet port 51 is connected to a pipe 53 to which a pressure medium, such as compressed air, is supplied at a substantially constant pressure, having a value of say, 60 pounds per square inch. The valve body has an outlet port 56 located between the inlet and exhaust ports 51 and 52, respectively. The value of the pressure at the outlet port and as delivered to pipe 15 will vary from atmospheric as when the inlet port is completely closed, to the value of the pressure in the supply pipe 53, as when the exhaust port is completely closed. When valve 42 occupies positions between those extreme positions, the pressure delivered to pipe 15 will be proportional to the relative constriction or throttling of the inlet and exhaust ports.

Dashpot mechanism 38 comprises a piston 60 that operates in a cylinder 61 which is open at its opposite ends. Piston 60 is connected by a spring 60' to diaphragm 35 through a flexible seal 40' as shown. The lower end of the cylinder communicates with the interior of a bellows 62 mounted in a pressure-tight housing 63. The bellows is urged in a direction of maximum volume by a compression spring 64. The upper end of cylinder 61 communicates with a chamber or reservoir 65 and a bypass 66 connects the cylinder 61 at a point below piston 60 with the reservoir. A needle valve 67 is provided in the bypass 66 to control the rate of flow of a liquid such as oil from the interior of bellows 62 to the reservoir 65, and vice versa. The interior of housing 63 is connected to sending line 16 by a pipe 16' so that the pressure in housing 63 acting to compress bellows 62, will be equal to the pressure transmitted to the pilot valve mechanism 17 of power cylinder 3 by valve 14 or by the hand actuated regulator 7.

Since the dashpot mechanism is acted upon by the pressure transmitted by valve 14, it tends to resist sudden movement of diaphragm 35 and therefore sudden movements of valve 42 as the force of the pressure acting on diaphragm 35 is transmitted to piston 60 of the dashpot through a spring 17. If a sudden increase of pressure is applied to diaphragm 35 tending to move it downwardly, the liquid in the dashpot system resists movement of piston 60; and spring 60' acts to resist movement of the diaphragm but valve 42 is opened wider. As the increased output pressure of valve 42 increases the pressure on bellows 62, the piston 60 is urged upwardly while at the same time fluid is displaced through the bypass. The pilot mechanism 17 responds to the output pressure of valve 14 causing the power cylinder to shift damper 2 to a position corresponding to that pressure, and thereby decrease the pressure in the furnace. As the regulated pressure approaches the desired value, diaphragm 35 will come to rest in a stable position. If the change in pressure on diaphragm 35 is such that the diaphragm tends suddenly to move upwardly, the dashpot mechanism and spring 60' act to restrain such sudden movement with a corresponding sudden shifting of valve 42. When the regulated pressure approaches the control point value the effect of the dashpot on the movement of diaphragm 35 is dissipated.

By adjusting the tension of spring 47 the control point of the regulator may be adjusted, that is, the control system can be set to hold the regulated pressure at values above or below atmospheric or at atmospheric.

The hand operated regulator 7 comprises a flanged cylindrical member 70, a flanged housing 71 and a diaphragm 72, the marginal edge of which is clamped between the flanges of the housing and cylindrical member. The central portion of the diaphragm is provided with an exhaust port member 73 that co-acts with a valve stem 74. One end of the valve stem 74 seats on the exhaust port and the opposite end is provided with an element 75 disposed to seat on an inlet port 76. A source of supply of fluid pressure such as compressed air, at constant pressure, having a value of say, 60 pounds per square inch, is supplied to the inlet port 76 by a pipe 77. The pressure established within housing 71 is controlled by a compression spring 78 and a hand wheel 79 having a threaded stem 80 that has threaded engagement with a bearing member 81. By turning hand wheel 79 the position of bearing member 81 may be adjusted along stem 80 to thereby adjust the force exerted by spring 78 on the diaphragm. For any given value of tension in spring 78, the pressure established in housing 71 will be such as will cause the pressure acting on the diaphragm to exert an equal and opposite force. When the total force of the pressure in housing 71 acting on diaphragm 72 is equal to the force exerted by spring 78 on the diaphragm, both the inlet and exhaust ports are closed by valve stem 74. The pressure established in housing 71 is delivered through pipe 18 to the transfer mechanism 8.

The output pressure of valve 14 may be transmitted from pipe 15 through a pipe 83 to a gage 84, at the panel board; likewise, the pressure established by regulator 7 in line 18 may be transmitted through a pipe 85 to a gage 86 at the panel board.

Assuming that the control system is operating automatically, the transfer valve 23 will be in the position shown in Fig. 1, and the output pressures of valve 14 of regulator 6 will be delivered to the pilot valve mechanism 17 of power cylinder 3. Damper 2 will be actuated by cylinder 3 from one position to another between open and closed positions, as required to maintain the regulating pressure in the furnace at the desired value. If, for some reason, it is desired to transfer regulation of the regulated pressure from automatic to manual control, the operator will read the value of the pressure shown by gage 84 that is being transmitted to the pilot valve mechanism 17 by regulator 6, and then adjust the hand regulator 7 until the pressure in pipe 18 as shown by gage 86 is equal to the pressure shown by gage 84. When these pressures are equal the transfer valve 10 is actuated to the position in which pressure is delivered to diaphragm 27, causing the transfer valve 23 to move downwardly and close port 20 and open port 21. Control of the regulated pressure may now be effected by the hand regulator 7. By turning the hand wheel 79 the pressure sent out through lines 18 and 16 to the pilot valve mechanism 17 may be adjusted to any value desired. By this method of control the regulated pressure may be established at any value desired within the range of the system. While the system is under manual operation, the value of the output pressure of valve 14 (regulator 6) will be shown on gage 84, and the gage reading will be a measure of the regulated pressure in the furnace. That value may be higher or lower than the control point for which regulator 6 is adjusted to operate on automatic. Therefore, when it is desired to shift the control system from manual to automatic operation, regulator 7 is adjusted until the pressure shown by gage 84 corresponds to the regulated pressure to be maintained in the furnace. At that time the pressures shown by gages 84 and 86 will be equal or substantially equal. The transfer valve 10 can then be switched to automatic position and valve 23 returned to automatic position.

In cases where pipe 83 is long and has a substantial volume, the transfer of the system from automatic to manual operation, or vice versa, may be accomplished without any sudden changes in pressure or "bump effect" in line 16 by placing an orifice 87 in pipe 83 at a point relatively close to transfer mechanism 8.

The volume of line 16 and of the bellows chamber 63 is such that at the time of transfer from automatic to manual or vice versa, the pressure in line 16 leading to pilot valve mechanism 17 will not suddenly change. Therefore, it will be apparent that the system may be changed from manual to automatic operation or vice versa without experiencing the so-called "bump" that is common in control systems that are designed for either automatic or manual operation. It will also be apparent that transfer from automatic to manual operation may be effected at a point quite remote from the location of the regulators and power operators embodied in the system.

Having thus described the invention, it will be apparent to those skilled in this art, that various modifications and changes may be made in the illustrated embodiment without departing from either the spirit or the scope of the invention.

Therefore, what is claimed as new and desired to be secured by Letters Patent is:

1. A control system embodying means located at a pre-selected point for automatically regulating pressures at said point, manually-actuated means located at a point remote from said pre-selected point for regulating such pressures, and means located at said remote point for selectively transferring the control of said pressures from automatic to manual, said control system comprising a device located at the pre-selected point that is responsive to the pressure to be regulated, and provided with means for developing a control force whose magnitude varies with, and in response to, deviations of the regulated pressure from a predetermined value, means actuated by said control force for adjusting said regulated pressure, a manually-actuated control force sending device located at a point remote from said pre-selected point and adapted to deliver a control force whose magnitude is controlled by manual adjustment thereof, a transfer mechanism located at said pre-selected point for selectively transmitting one or the other of said control forces to said controlled pressure-adjusting means, said transfer mechanism being biased to a position where one of said control forces is normally transmitted to said regulated pressure-adjusting means, manually operable means located at said remote point for actuating said transfer mechanism to the other of its control force transmitting positions, and a conduit connected to the control force developed by said device, that responds to deviations in the regulated pressure, having therein means for delaying changes in said control force when the transfer mechanism is actuated from one to the other of its manual or automatic positions.

2. Apparatus for regulating the pressure of a fluid medium flowing through a confined passage comprising a valve for controlling the flow of said medium, means for actuating said valve, a regulator having a pressure deflectable member responsive to the pressure of said fluid at predetermined point in said passage, said regulator being provided with an escapement valve disposed to be actuated by said deflectable member and to deliver an automatically adjusted control pressure to said valve actuating means, the control pressure varying in magnitude with deviations in the pressure of said fluid from a predetermined value, in combination with means for selectively transferring control of the operation of said valve adjusting means from automatic to manual from a point remote from said regulator and valve actuating means, said transferring means comprising a hand sender having means for delivering a control pressure whose magnitude varies with manual adjustment of the sender, a transfer valve having an outlet port connected to said valve actuating means and inlet ports connected to receive said automatic and manual control pressures, means for selectively connecting one or the other of said inlet ports to said outlet port, and manually controlled pressure actuated means for actuating said connecting means to selectively connect one or the other of said inlet ports to the outlet port of said transfer valve means located at said remote point for delivering an operating pressure to said manually controlled pressure actuated means, a conduit extending from said remote point to, and communicating with, the control pressure delivered by said regulator, said conduit having pressure indicating means at said remote point, and an orifice in said conduit adjacent said regulator, said conduit and orifice acting to stabilize the control pressure from said regulator during transfer of the apparatus from manual to automatic control, and vice versa.

3. Apparatus according to claim 2, characterized by the fact that a liquid damping means is connected to said deflectable member, said damping means having a variable volume member containing a liquid and disposed in a pressure tight housing, said housing being connected to the outlet port of said transfer valve whereby the volume of said variable volume member is caused to vary inversely with the magnitude of said pressure, said damping means stabilizing the deflectable member against hunting and resisting change in the magnitude of the control pressure delivered from the outlet port of said transfer valve at the time the same is shifted from automatic to manual control pressure position.

4. A system according to claim 1, characterized by the fact that the regulated pressure responsive device comprises a housing having a diaphragm therein, the diaphragm deflecting in response to a differential pressure imposed thereon, a valve connected to and actuated by said diaphragm for delivering an output control pressure that varies with said differential pressure, means biasing said diaphragm and valve towards a zero differential position, that a damping device is coupled to said diaphragm and comprises a housing having a flexible walled container therein, the container having connected thereto a cylindrical riser, a piston in the riser, a yieldable member connecting said piston and diaphragm, and a by-pass having and orifice therein connecting the interior of said riser and flexible container at locations above and below said piston, the housing for said flexible walled container being connected to the transmitting side of said transfer mechanism, and that the manually operable means comprises a valve for transmitting pressures of adjustable magnitude, said damping device operating to stabilize the sending pressure from said transfer device to the valve actuating device during the transition from automatic to manual control thereof.

References Cited in the file of this patent

UNITED STATES PATENTS

| Number | Name | Date |
|---|---|---|
| 976,907 | Pagendarm | Nov. 29, 1910 |
| 1,855,060 | Landenberger | Apr. 19, 1932 |
| 2,112,466 | Maloon | Mar. 29, 1938 |
| 2,149,390 | Donaldson | Mar. 7, 1939 |
| 2,202,286 | Gorrie | May 28, 1940 |
| 2,369,887 | Eckman | Feb. 20, 1945 |
| 2,507,606 | McLeod | May 16, 1950 |
| 2,536,184 | Johnson | Jan. 2, 1951 |
| 2,543,846 | Griswold | Mar. 6, 1951 |
| 2,588,799 | Booth | Mar. 11, 1952 |